(12) United States Patent
Jeong et al.

(10) Patent No.: US 6,348,916 B1
(45) Date of Patent: Feb. 19, 2002

(54) APPARATUS FOR IMPLEMENTING STEREOSCOPIC IMAGES IN COMPUTER SYSTEM

(75) Inventors: Sung C Jeong; Joong S Lee, both of Seoul (KR)

(73) Assignee: Nam Eun Park, Kyungki-do (KR)

( * ) Notice: Subject to any disclaimer, the term of this patent is extended or adjusted under 35 U.S.C. 154(b) by 0 days.

(21) Appl. No.: 09/251,748

(22) Filed: Feb. 18, 1999

(30) Foreign Application Priority Data

Feb. 18, 1998 (KR) .............................. 98-4863

(51) Int. Cl.[7] ................................ G09G 5/00
(52) U.S. Cl. ........................ 345/213; 348/56
(58) Field of Search .................. 345/213, 214, 345/716, 719; 359/462, 465; 348/51, 54, 66

(56) References Cited

U.S. PATENT DOCUMENTS

| | | | | |
|---|---|---|---|---|
| 4,562,463 A | * | 12/1985 | Lipton ........................... | 348/56 |
| 4,692,792 A | * | 9/1987 | Street ........................... | 348/56 |
| 5,083,851 A | * | 1/1992 | MacDonald .................. | 359/462 |
| 5,821,989 A | * | 10/1998 | Lazzaro et al. ................ | 348/56 |
| 5,870,137 A | * | 2/1999 | Stuettler ........................ | 348/51 |
| 5,991,074 A | * | 11/1999 | Nose et al. ................... | 359/465 |

\* cited by examiner

*Primary Examiner*—Chanh Nguyen
*Assistant Examiner*—Fritz Alphonse
(74) *Attorney, Agent, or Firm*—Greenblum & Bernstein, P.L.C.

(57) ABSTRACT

An apparatus for implementing stereoscopic images without control programs on a CRT monitor in a computer system includes a video adapter storing the information of stereoscopic images reading out the contents of the information, and outputting them as analog image signals of red, green and blue colors, vertical synchronizing signals and horizontal synchronizing signal, an analog scan line controller operating in response to external on/off control signals, and outputting the analog image signals including left eye image information and right eye image information to the monitor in response to the vertical synchronizing signals from the video adapter, and a shuttering device being operated by at least any one of the signals from the video adapter.

3 Claims, 4 Drawing Sheets

APPARATUS FOR IMPLEMENTING STEREOSCOPIC IMAGES IN COMPUTER SYSTEM

BACKGROUND OF THE INVENTION

1. Field of the Invention

The present invention relates to an apparatus for implementing stereoscopic images in a computer system, and more particularly to an apparatus for implementing stereoscopic images that have a scan line controller positioned between a VGA(Video Graphic Adapter) card and a CRT (Cathode Ray Tube) monitor in the computer system.

2. Description of Prior Art

In general, a technical principle for implementing stereoscopic images is that a person perceives a cubic effect by providing images in different visual angles for left eye and right eye. Each of the stereoscopic images consists of an image(left eye image) photographed in left eye side and an image(right eye image) photographed in right eye side.

Up to now, such a technique implementing the stereoscopic images is achieved by combining left eye image with the right eye image, and displaying the combined images on a CRT monitor. As typical method displaying the stereoscopic images on the monitor, there is an interlaced scan method that the left eye images and/or the right eye images are alternately displayed on even scan lines or odd scan lines of each field on the CRT monitor.

In the case of displaying the stereoscopic images on the CRT monitor according to the interlaced scan method, it is necessary for embedding a control program in a computer program to implement the stereoscopic images. The control program controls the computer VGA card and displays the stereoscopic images combined with the left eye image and the right eye image on the CRT monitor.

However, the interlaced scan method requires individual control programs corresponding to the types of VGA cards or the resolution mode of each VGA card because the property for each VGA card and the resolution of each VGA card are different. Also, it is necessary for much times and efforts to develops the control programs. It is substantially impossible to develops the control programs corresponding to all types of VGA cards.

Moreover, even though the control programs corresponding to all types of VGA cards have been developed, they should be revised according to the computer type because the control programs are not compatible in the different computer types. Also, in the case that user executes the control program in his(or hers) computer system, the user should change the settings of the VGA card according to the individual resolution mode.

In the recent, there is a tendency to do not use the interlaced scan method in the manufacture of the VGA card due to a flicker phenomenon which is generated when the properties(e.g. refresh rate of screen etc.) of the CRT monitor are not appropriate. Accordingly, it becomes more and more difficult to implement the stereoscopic images on the CRT monitor using the control programs.

SUMMARY OF THE INVENTION

In view of the foregoing, and object of the present invention is to easily implement stereoscopic images on a CRT monitor by positioning a scan line controller between the output of a computer graphic board and an input of the monitor without using the complicated control programs.

To achieve the above object, the present invention provides an apparatus for implementing stereoscopic images in a computer system comprising a video adapter storing the information of stereoscopic images consisted of left eye images and right eye images and the information of characters, reading out the contents of the information, and outputting them as analog image signals of red, green and blue colors, vertical synchronizing signals and horizontal synchronizing signals, and a monitor displaying the information of stereoscopic images and the information of characters, said apparatus comprising;

a scan line controller being operated in respond to an external on/off control signals, and outputting said analog image signals including left eye image information and right eye image information to the monitor in respond to said vertical synchronizing signal from said video adapter, in order to display the left eye image information or the right eye image information on odd scan lines or even scan lines of the monitor;

a shuttering means being operated by at least any one of signals from said video adapter, shuttering the left eye image information displayed on the odd scan lines or even scan lines to prevent them having been perceived a right eye, and shuttering the right eye image information displayed on the odd scan lines or even scan lines to prevent them having been perceived a left eye.

BRIEF DESCRIPTION OF THE DRAWINGS

The above object, and other features and advantages of the present invention will become more apparent by describing in detail preferred embodiment thereof with reference to the attached drawings, in which.

DETAILED DESCRIPTION OF THE INVENTION

Hereinafter, an apparatus for implementing stereoscopic images in a computer system according to an embodiment of the present invention will be described with reference to the accompanying drawings.

Figure 1:
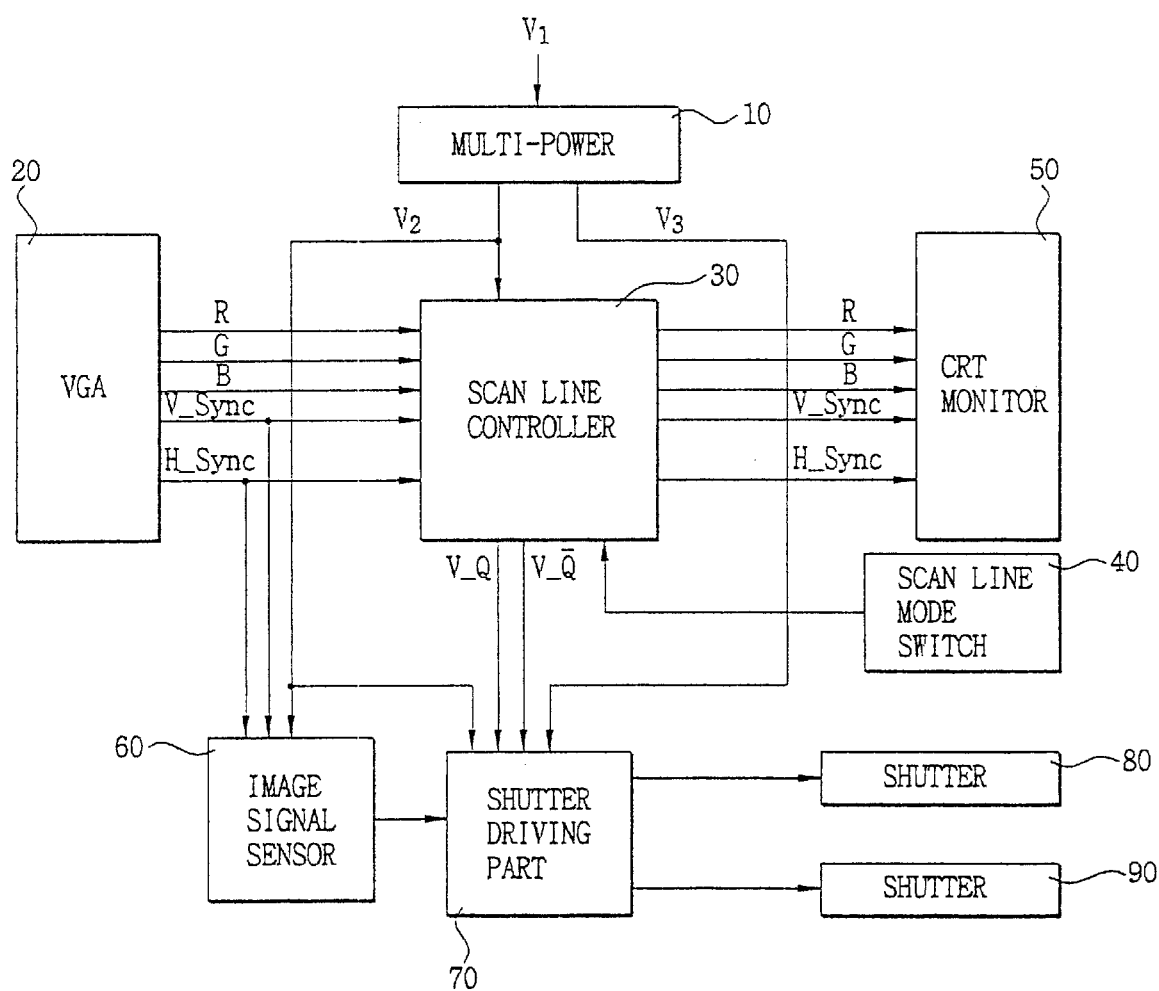
FIG. 1 is a schematic block diagram of an apparatus for implementing stereoscopic images in a computer system having a CRT monitor according to an embodiment of the present invention.

Referring to FIG. 1., reference numeral 10 denotes multipower dividing the first voltage V1 supplied from an external electric source or a power supply in the computer system into two voltages V2 and V3, and supplying to the apparatus for implementing stereoscopic images in the computer system according to the present invention, reference numeral 20 denotes VGA card storing the information to be displayed on the monitor, reading out the contents of the information, and converting them to control signals of the monitor, reference numeral 30 denotes a scan line controller outputting left eye image signals or right eye image signals of stereoscopic image signals to the monitor in respond to the vertical synchronizing signals from the VGA card to display the left eye images or right eye images to display on odd scan lines or even scan lines of the monitor, reference numeral 40 denotes a scan line mode switch controlling the scan line controller 30 in on/off mode by a handling of the user or a programmed key input, reference numeral 50 denotes a CRT monitor, reference numeral 60 denotes an image input signal sensor detecting the input image signals from the VGA card 20, reference numeral 70 denotes a shutter driving part outputting the shutter driving signal in respond to the image signals detected by the sensor 60 and the control signals from the scan line controller 30, reference numeral 80 denotes a left eye shutter perceiving the left eye image displayed on the monitor 50, and reference numeral 90 denotes a right eye shutter perceiving the right eye image displayed on the monitor 50, said shutters 80 and 90 may be glasses type or safety goggles type.

Figure 2:
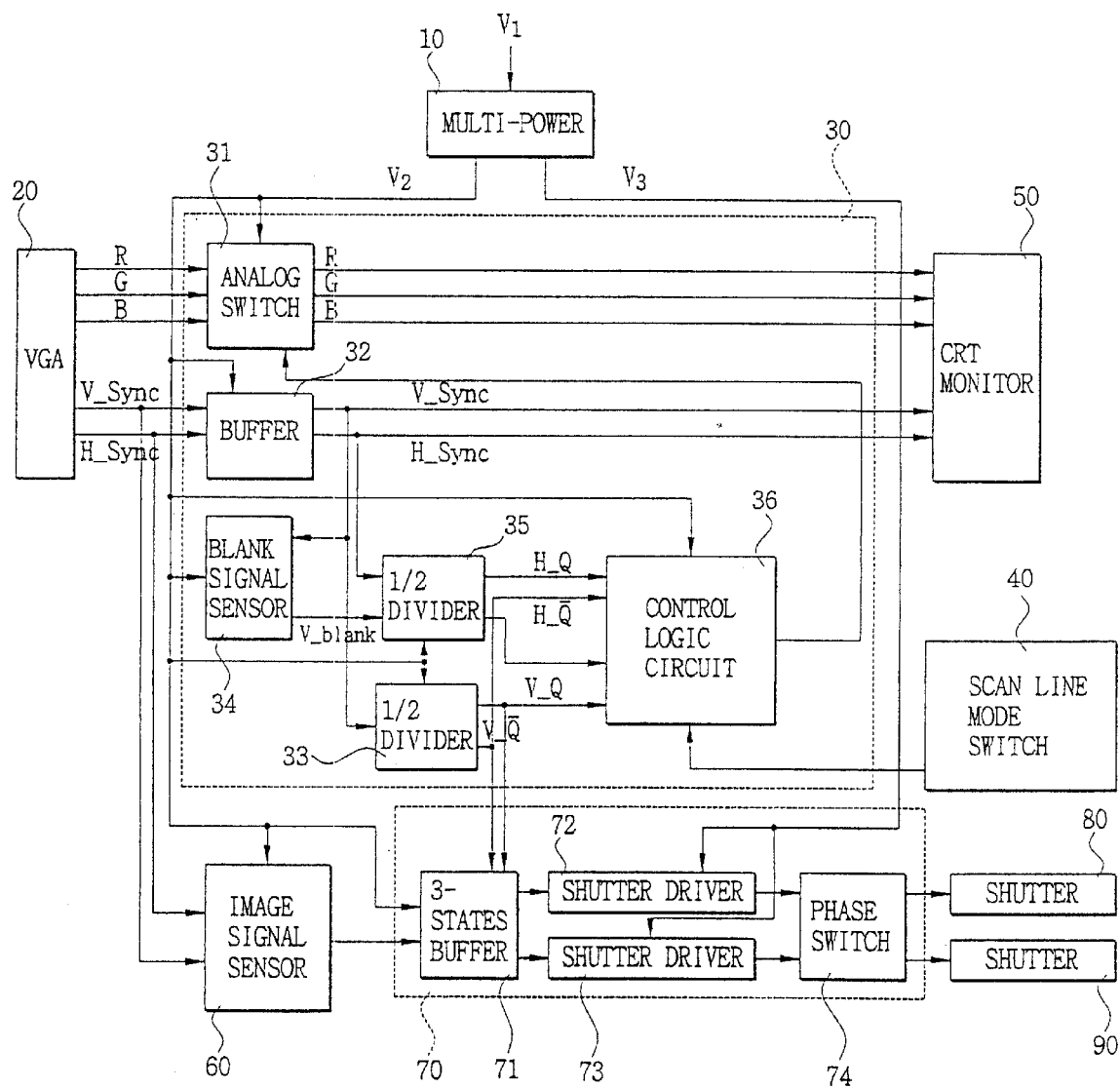
FIG. 2 is a detailed block diagram of principal parts FIG. 1.

Referring to the FIG. 2, there is a detailed circuit block diagram of the scan line controller 30 and the shutter driving part 70 shown in FIG. 1. In FIG. 2, the scan line controller 30 comprises a synchronizing signal buffer 32, a vertical ½ divider 33, a sensor 34 detecting a vertical blanking signal, a horizontal ½ divider 35, and a control logic circuit 36. The shutter driving part 70 comprises a 3-states buffer 71, a left eye shutter driver 72, a right eye shutter driver 73 and a phase switch 74 switching the left or right stereoscopic images.

Figure 3:
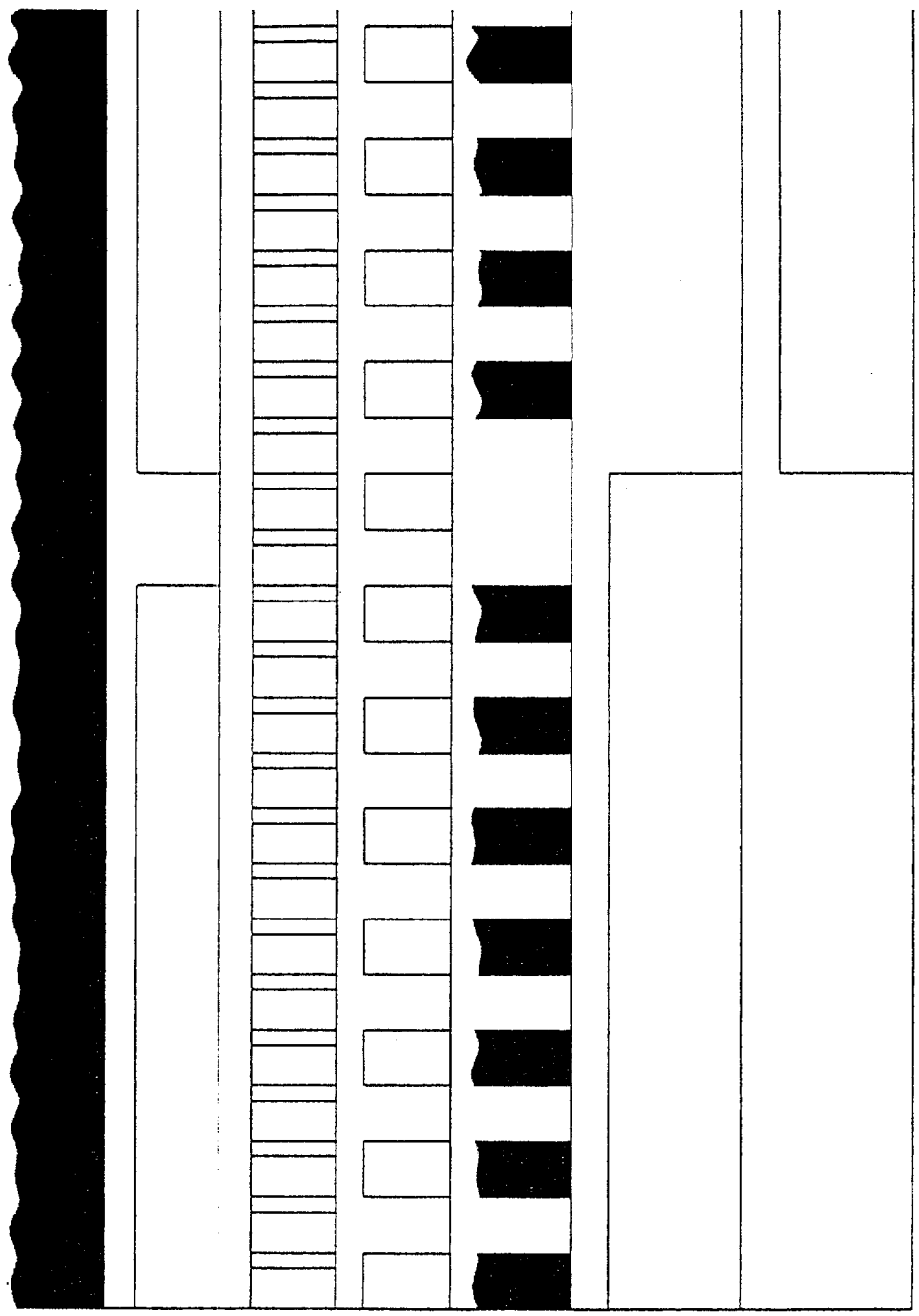
FIG. 3 is waveform views showing signals output from principal parts shown in FIG. 2.

The operation of the apparatus according to the present invention will hereinafter be described with reference to the FIGS. 1 and 3.

Referring to FIG. 1., the first voltage V1 applied to multipower 10 may be a commercial voltage level in an external type or a computer internal voltage level supplied from the computer power supply in an built-in type. When the first voltage V1 is applied to the multipower 10, the multipower 10 divides the first voltage V1 into the second voltage V2, e.g., 5 V and the third voltage V3, e.g., 9~12 V. The second voltage V2 is applied to the scan line controller 30, the sensor 60, and 3-states buffer 71(Fig, 2) of the shutter driving part 70 respectively, and the third voltage V3 is applied to shutter drivers 72 and 73(FIG. 2) of the shutter driving part 70.

The VGA card 20 processing the information to be displayed on the monitor 50 outputs analog image signals R, G and B representing red, green and blue colors respectively, a vertical synchronizing signal V_Sync, and a horizontal synchronizing signal H_Sync to the scan line controller 30.

The sensor 60 outputs a control signal in respond to any one of the signals output from the VGA card 20 to control the operation of the shutter driving part 70. In FIG. 1, the vertical synchronizing signal V_Sync and the horizontal synchronous signal H_Sync is shown as input signals of the sensor 60. However input signals of the sensor 60 are not restricted to the above signals, it is possible to use any one of signals output from the VGA card 20. A, B and C in FIG. 3 show the waveforms of the signals output from the VGA card 20.

The scan line controller 30 outputs the signals R, G, B, V_Sync and H_Sync from the VGA card 20 to the monitor 50 in respond to the control signal(on control signal or off control signal) from the scan line mode switch 40, and outputs the shutter synchronizing signal to the shutter driving part 70 to operate the shutters 80 and 90. From the above construction, when the scan line mode switch 40 selects the off mode to output the operation disable signal, the scan line controller 30 outputs the analog image signals R, G and B to the monitor 50 without separating them into the left eye image signal and the right eye image signal, and when the scan line mode switch 40 selects the on mode to output the operation enable signal, the scan line controller 30 separates the analog image signals R, G and B into the left eye image signal and the right eye image signal and outputs the separated image signals to the monitor 50.

The scan line controller 30 applies also the shutter synchronizing signal(F and G in FIG. 3) to the shutter driving part 70. The construction and operation of the scan line controller 30 and the shutter driving part 70 will be more detailed described with reference to the FIGS. 2 and 3.

The shutter driving part 70 operates the left eye shutter 80 and the right eye shutter 90 in respond to the shutter synchronizing signal. When an user puts on his shutters 80 and 90 and stares at the monitor 50, the user can perceive the stereoscopic images.

Hereinafter, the operation of the apparatus according to the presents invention will be more detailed described with reference to the FIGS. 2 and 3.

The second voltage V2 from the multipower 10 is applied to the analog switch 31, the synchronizing buffer 32, the vertical ½ divider 33, the vertical blanking signal sensor 34, the horizontal ½ divider 35 and the control logic circuit 36, respectively to be used as a scan line control voltage. Also, the second voltage V2 is applied to the sensor 60 detecting the image input signals and the 3-states buffer 71 in the shutter driving part 70 to be used as the control voltage controlling the shutters 80 and 90. The third voltage V3 is applied to the shutter drivers 72 and 73 in the shutter driving part 70 to be used as an operation voltage of the shutters 80 and 90.

The analog image signals R, G and B(A in FIG. 3) is input to the analog switch 31, the vertical synchronizing signal (V_Sync) (B in FIG. 3) and the horizontal synchronizing signal (H_Sync) (C in FIG. 3) are input to the synchronizing signal buffer 32 and the sensor 60.

The vertical synchronizing signal V_Sync from the synchronizing signal buffer 32 is input to the monitor 50, the vertical ½ divider 33 and the vertical blanking signal sensor respectively, and the horizontal synchronizing signal H_Sync from the synchronizing signal buffer 32 is input to the monitor 50 and the horizontal ½ divider 35 respectively.

The output signals V_Q and V_$\overline{Q}$ from the vertical ½ divider have a 50% duty rate of the vertical synchronizing signal from the synchronizing signal buffer 32, and the output signals H_Q and H_$\overline{Q}$ from the horizontal ½ divider 35 have a 50% duty rate of the horizontal synchronizing signal from the synchronizing signal buffer 32.

The vertical blanking signal sensor 34 detects whether or not the vertical synchronizing signal V_Sync has a blank, and outputs the vertical blanking signal V_blank if the V_Sync has a blank. The vertical blanking signal V_blank is input to the reset terminal of the horizontal ½ divider 35. The horizontal vertical ½ divider 35 is initialized by the vertical blanking signal V_blank. After the initialization, when the horizontal synchronizing signal from the synchronizing signal buffer 32 is input to the horizontal ½ divider 35, the divider 35 outputs the synchronizing signal having a 50% duty rate of the horizontal synchronizing signal from the synchronizing signal buffer 32.

The output signals H_Q, H_$\overline{Q}$, V_Q and V_$\overline{Q}$ are input to the control logic circuit 36.

The control logic circuit 36 outputs a control signal to the analog switch 31 in respond to the on/off control signals from the scan line mode switch 40. When the scan line mode switch 40 outputs the operation disable signal to the control logic circuit 36 by the selection of the off mode, the control logic circuit 36 outputs an off control signal to the analog switch 31.

The analog switch 31 transfers the analog image signals R, G and B from the VGA card 20 to the monitor 50 according to the off control signal from the control logic circuit 36. On the other hand, when the scan line mode switch 40 outputs the operation enable signal to the control logic circuit 36 by the selection of the on mode, the control logic circuit 36 outputs an on control signal(D in FIG. 3) to the analog switch 31. In respond to the control signal from the control logic circuit 36, the analog switch 31 outputs the analog image signals R, G and B as shown in E of FIG. 3 to the odd scan line and generates the blanking signal on the even scan line. Otherwise the analog switch 31 outputs the analog image signals R, G and B to the even scan line and generates the blanking signal on the odd scan line.

Figure 4:
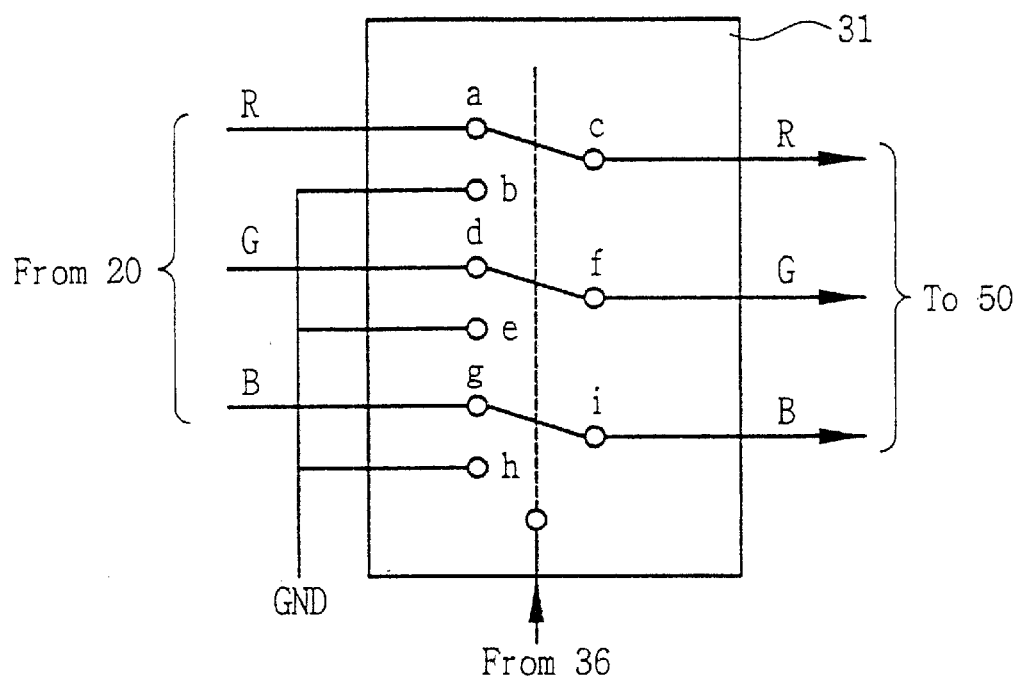
FIG. 4 is a circuit view showing the analog switch shown in FIG. 2.

The analog switch 31 may be a usual switch as shown FIG. 4 or other electronic type switches.

The analog switch 31 of FIG. 4 is constructed to have two input terminals and one output terminal for each analog image input signal R, G or B. In FIG. 4, symbols a, d and g denote the input terminals receiving the each analog image input signal R, G or B from the VGA card 20 respectively, and symbols b, e and h denote the ground terminals and symbols c, f and i denote the output terminals respectively. The analog switch 31 is controlled by the control signal from the control logic circuit 36. When the on control signal is input to the analog switch 31, the input terminals a, d and g are connected to the output terminals c, f and i respectively to output the analog image signals R, G and B to the monitor 50. Accordingly, the stereoscopic images can be displayed on the monitor 50. On the other side, when the off control signal is input to the analog switch 31, the ground terminals b, e and h are connected to the output terminals c, f and i respectively, to not output the analog image signals. Accordingly, the black is displayed on the monitor 50.

The sensor 60 detects whether or not the vertical synchronizing signal or the horizontal synchronizing signal is input thereto. If the signal is detected, the sensor 60 outputs the detected signal to the 3-states buffer 71.

When the detected signal is input to the 3-states buffer 71, the buffer 71 transfers the shutter synchronizing signals(F and G in FIG. 3) from the vertical ½ divider 33 to the shutter drivers 72 and 73. However any image signal is not detected by the sensor 60, the buffer 71 becomes a cut-off state.

The shutter drivers 72 and 73 amplify the third voltage V3 to voltage level for driving the shutter 80 and 90, and outputs the amplified voltage to the phase switch 74 for switching the phase of the stereoscopic image.

If the left images and right eye images are not synchronized with the left eye shutter 80 and right eye shutter 90 respectively, the phase switch 74 has a function enabling the left eye image and right eye image to synchronize the left eye image shutter 80 and the right eye shutter 90 respectively by activating the shutters 80 and 90.

Figure 5:
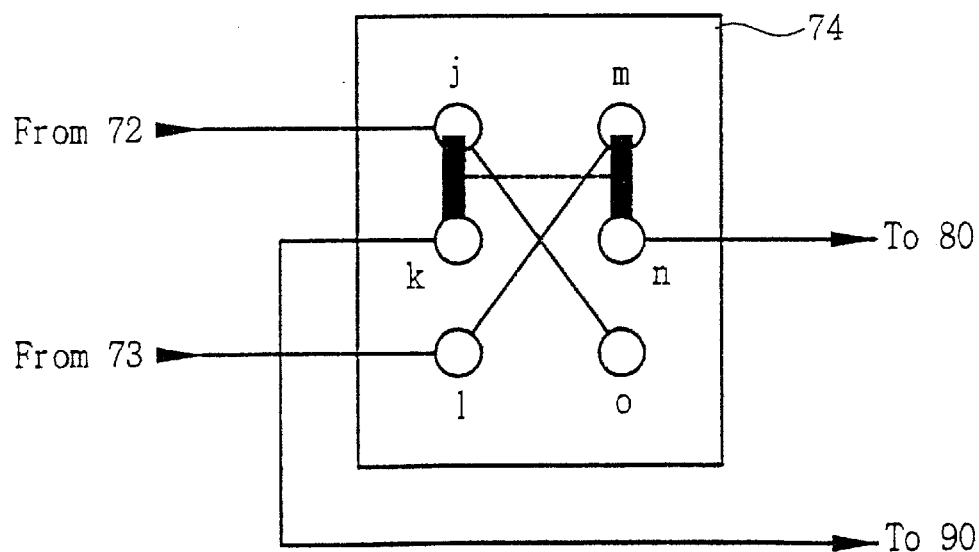
FIG. 5 is a circuit view showing the phase switch of stereoscopic images shown in FIG. 2.

The phase switch 74 may be constructed by using a usual switch as shown in FIG. 5 or other electronic type switches. In FIG. 5, when the shutter driving signals are input to the input terminals j and I of the phase switch 74, the phase switch 74 outputs the shutter driving signals through two output terminals (k and n) to the shutter 80 and 90. When the shutter driving signals are input to the shutters 80 and 90, the left eye shutter 80 and the right eye shutter 90 become operable.

As above described according to the present invention, if the scan line mode switch 40 outputs the operation enable signal to the scan line controller 30, it is possible to display the stereoscopic images consisted of the left eye images and the right eye images on a display device using the CRT monitor 50. Accordingly when an user puts on his(or hers) shutters 80 and 90 and stares at the monitor 50, the user can perceive the stereoscopic images. It is possible to easily implement the stereoscopic images in the computer system without considering the development for the individual control programs according to the types of VGA cards or the compatibility of computers.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. An apparatus for implementing stereoscopic images in a computer system comprising:

a video adapter storing information of stereoscopic images having left eye images and right eye images and information of characters, reading out the contents of the information, and outputting the information of stereoscopic images as analog image signals of red, green and blue colors, vertical synchronizing signals and horizontal synchronizing signals;

a monitor displaying the information of stereoscopic images and the information of characters;

an analog scan line controller operating in response to external on/off control signals, and outputting said analog image signals including left eye image signal and right eye image signal to the monitor in response to said vertical synchronizing signals from said video adapter in order to display one of the left eye image signal and the right eye image signal on one of odd scan lines and even scan lines of the monitor, said analog scan line controller comprising an analog switch circuit that outputs the analog image signals from said video adapter to the monitor when the off control signal is input to said analog scan line controller, that separates the analog image signals into the left eye image signal and the right eye image signal in response to the vertical synchronizing signal when the on control signal is input to said analog scan line controller, and that outputs the separate signals to the monitor;

a shuttering device operated by at least one of the signals from said video adapter, shuttering the left eye image signal displayed on one of the odd scan lines and even scan lines to prevent the left eye image signal being perceived by a right eye, and shuttering the right eye image signal displayed on one of the odd scan lines and even scan lines to prevent the right eye image signal being perceived by a left eye, wherein said shuttering device includes:

an image signal sensor detecting any one of said analog image signals, said vertical synchronizing signals and said horizontal synchronizing signals from said video adapter;

a three state buffer outputting a control signal according to signals based on the horizontal synchronizing signal and vertical synchronizing signal when said image signal sensor detects any one of said signals from said video adapter;

a shutter driving device generating a driving signal in response to said control signal from said three-state buffer; and a shutter device operating in response to said driving signal from said shutter driving device to make a user to perceive said left eye image signal and said right eye image signal.

2. An apparatus as claimed in claim 1, wherein said analog scan line controller further comprises:

a blanking signal sensor detecting whether or not said vertical synchronizing signal has a blank and outputting a blanking signal when the blank is detected;

a horizontal dividing device being initialized by said blanking signal from said blanking signal sensor, dividing said horizontal synchronizing signal into ½ and outputting said ½ divided signal;

a vertical dividing device dividing said vertical synchronizing signal into ½ and outputting said ½ divided signal; and a control logic circuit receiving the divided signals from said horizontal dividing device and said vertical dividing device, and outputting a control signal for controlling said analog switch in response to said on/off control signals.

3. An apparatus as claimed in claim 1, wherein said shutter device comprises:

a left eye shutter and a right eye shutter; and a phase switching device being positioned between said shutter driving device and said shutter device, said phase switching device switches the phase of one of the left eye image and the right eye image if the left eye image is not synchronized with the left eye shutter, and the right eye image is not synchronized with the right eye shutter, respectively.

* * * * *

UNITED STATES PATENT AND TRADEMARK OFFICE
CERTIFICATE OF CORRECTION

PATENT NO.   : 6,348,916 B1                                      Page 1 of 1
DATED        : February 19, 2002
INVENTOR(S)  : S.C. Jeong et al.

It is certified that error appears in the above-identified patent and that said Letters Patent is hereby corrected as shown below:

<u>Title page,</u>
Item [57], ABSTRACT,
Line 7, "signal" should be -- signals --.

Signed and Sealed this

Eleventh Day of February, 2003

JAMES E. ROGAN
*Director of the United States Patent and Trademark Office*